Patented Sept. 4, 1945

2,384,388

UNITED STATES PATENT OFFICE 2,384,388

MODIFIED WHOLE CORN PROTEIN AND METHOD OF PREPARING SAME

Richard Nicholas Monte, La Grange, and Jacob B. Gottfried, Chicago, Ill., assignors to Corn Products Refining Company, New York, N. Y., a corporation of New Jersey No Drawing. Application July 1, 1943, Serial No. 493,070

2 Claims. (Cl. 260—112)

This invention relates to a modified whole corn protein product and to processes for the production thereof.

The wet milling of corn yields a number of primary products, chief among which are starch and gluten, the latter consisting predominantly of whole corn protein. Whereas starch has long been used in many industrial applications, whole corn protein, generally speaking, has not found its way into industry, but has been incorporated in cattle feeds and the like.

The present invention concerns the production of a modified whole corn protein product which can be manufactured relatively simply and inexpensively, and which lends itself to successful industrial use, as in paper clay coating compositions, greaseproofing compositions, cold water paints and the like. Such applications require a product which will readily disperse in water, at relatively low alkaline pH, which has high adhesive strength and which is low in color.

The process of the present invention provides such a product, and contemplates treating corn gluten in a series of inter-related steps in which undesirable products, e. g., starch, oil and color materials, are removed therefrom, and in which the proteinaceous material itself is desirably modified.

In brief, the process of the present invention comprises the steps of milling corn gluten to a predetermined relatively small particle size, subjecting the gluten to solvent extraction for removal of oil and color bodies and materials therefrom, washing the extracted gluten free of solvent, then subjecting the gluten to an acid hydrolyzing step of special character, neutralizing the acid to arrest hydrolysis, washing the modified protein product to remove solubles therefrom, and drying.

The acid hydrolysis must be carried out under conditions which are closely controlled within predetermined limits, if satisfactory results are to be obtained, for if the conditions of hydrolysis are either too mild or too severe, either ease of dispersibility or adhesiveness, and possibly both, of the finished product, will be without permissible limits. Earlier attempts to industrially utilize corn gluten have not been successful chiefly because of deficiencies in these two respects, both qualities being essential in the production of, for example, acceptable clay coatings.

The hydrolysis of the present invention does little more than initiate hydrolysis of the protein, thus rendering it capable of being readily dispersed in water by suitable wetting or dispersing agents under alkaline conditions, while insuring against impairment of the adhesive properties so essential to successful use of the modified protein in clay coatings and the like.

Moreover, too high a color is objectionable in clay coatings, cold water paints and the like. It is well known that the acid hydrolysis of proteins as conventionally practiced results in the formation of dark colored matter, of uncertain chemical identity, which is sometimes referred to as "humin." Previous attempts to so modify corn gluten by acid hydrolysis as to impart to it desirable characteristics with respect to solubility, for example, have resulted in the formation of a dark colored modified protein, unsuitable because of its color for various applications. The process of the present invention, however, provides a product which is extremely light in color, and hence well suited on this count, as well as because of its other desirable characteristics, for use in applications where color of the protein is of primary importance. As will appear, freedom from objectionable color results, in practicing the invention, from initial removal of color from the corn gluten by solvent action in the manner to be described, and from conducting the acid hydrolysis of the gluten under the conditions to be described, which involve the presence, in the gluten slurry undergoing hydrolysis, of a material such as a sulfite compound of sodium, adapted under the conditions of hydrolysis to release $SO_2$, sodium bisulfite or sodium sulfite, for example. The discovery that such material is effective to eliminate or substantially reduce color in this way was rather striking, as counter to common experience and belief that the presence of oxidizing agents during hydrolysis, e. g., peroxides, might be expected to perform such function, by well known bleaching effect. On the contrary, however, such oxidizing agents appear to increase the color of the protein during acid hydrolysis thereof, and even air exerts a substantial effect in this way. Agents such as sodium bisulphite or sodium sulphite, sulphur dioxide or other equivalents, however, and although the manner in which they function is not fully understood, appear either to inhibit color formation or to remove or destroy color materials as they are formed. In any event, products made according to the invention have been found to be of extremely satisfactory color.

Further features of the invention will appear from the following description of the manner in which it is preferably practiced. In such description, which is intended as merely illustrative and as limited only by the appended claims, the figures in parentheses indicate ranges within the purview of the invention.

The process is initiated by milling dried corn gluten to pass through a 100 mesh screen. Such gluten normally contains about 9% moisture. The material so used may be mill run gluten press cake, or gluten which has been subjected to centrifugal separating operations or the like to reduce the starch content thereof. Since the conventional methods of wet milling corn do not achieve complete separation as between starch and gluten, the latter generally contains substantial proportions of starch, the amount depending upon the efficiency of separation. The presence of some starch in the starting material is, therefore, contemplated, and the invention comprehends the treatment of gluten containing starch to the extent of about 50%, although a maximum starch content of about 35% is preferred. While starch in limited amount is not objectionable in the starting material, it is not desired in the modified protein product. As will appear, however, such starch is solubilized and substantially entirely removed from the protein during the course of the process.

The ground gluten is then subjected to an extraction step for the removal of oil and color. Preferably this is accomplished by suspending 800 lbs. of gluten in a mixture of about 350 gallons of hexane, about 50 gallons of ethyl alcohol such as that known commercially as Shellacol, and enough water to make the total water present correspond to 15% by weight of the dry substance gluten, and such suspension is agitated while maintained for about an hour at a temperature of about, but not substantially exceeding 90° F. If substantially more than about the specified amount of water is employed, the gluten tends to "ball up" and the extraction correspondingly is impaired by inability of the solvents to penetrate and act upon all particles of the gluten; and the filtration is thereby rendered almost impossible. If substantially less water is employed, the hexane does not efficiently accomplish the fat and color extraction intended. If the temperature were raised appreciably above 90° F. under the conditions described, extraction of zein from the corn gluten would tend to occur. Although the described mixture of hexane and ethyl alcohol is preferred, other solvents or solvent mixtures might be employed. Thus benzene, toluene and other similar hydrocarbon oil solvents might be used in place of hexane; and other relatively low boiling aliphatic alcohols, boiling at less than about 120° C., miscible with the hydrocarbon employed, such as isopropyl alcohol, might be used in place of ethyl alcohol.

Moreover, such extraction step might be effected, if desired, by use of such an alcoholic solvent (e. g., Shellacol) and water alone, without a hydrocarbon solvent, the total amounts of solvent and water being as above specified. When using such an alcoholic solvent care should be exercised not to have the temperature rise above 90° F., as the tendency to zein extraction is more marked when alcoholic extraction is employed than when extraction is effected by means of a hydrocarbon-alcohol mixture. If substantially more water is employed than the indicated total of about 15% this would tend to bring about extraction of zein from the gluten, whereas it is intended that the product of the present invention be a modified whole or entire corn protein.

While ground gluten subjected to the extraction step has, generally, an initial oil content of about 4% to 8%, this is reduced by the operation described, to about 0.75%, and comparable decrease in color is likewise effected by extraction as described.

After such extraction, the gluten is filtered, as in a Sperry plate and frame filter press, or centrifuged. The cake is preferably washed with hexane (or equivalent solvent) in the amount of about one half gallon per pound of gluten dry substance. The cake is then further washed with water at about 90° F. until the filtrate is entirely clear. Generally this requires not less than about 1 gallon of water per pound of gluten dry substance. If using a solvent not miscible with water, e. g., hexane, the cake is then further washed with water at a temperature in an amount and for a time sufficient to remove any such residual volatile solvent from the cake. The temperature of such wash water should be sufficiently high to volatilize such solvent, but not appreciably higher than such temperature. Thus where hexane is employed, the second water wash should be effected with water at a temperature of about 150° F.

Thereafter the gluten is subjected to acid hydrolysis effected as follows: The washed gluten cake is slurried with cold water, the concentration of the slurry being about 30 to about 50 ounces of dry substance gluten per gallon of water. A strong mineral acid being used to catalyze the hydrolysis, sulfuric or hydrochloric acid or equivalent is then added to the slurry. Preferably hydrochloric acid is employed, and in such quantity that the acidity of the slurry is adjusted to 0.6 normal (0.55 to 0.65), or about pH 1.0–1.2. Acid concentrations, when of such degree, are often expressed in terms of normality rather than of pH. If strong mineral acids other than hydrochloric should be used, e. g., if sulfuric acid should be used, sufficient thereof is added to adjust the pH of the aqueous media to that corresponding to 0.6 normality in the case of hydrochloric acid. Sodium bisulfite is then added to the extent of about 1 ounce of dry substance per 10 pounds of dry substance gluten. Equivalents of sodium bisulfite may be used instead, the amounts added in such case, however, being such as to effect comparable reducing action. The slurry having thus been prepared it is heated relatively rapidly to a temperature of 175° F. (160° F. to 200° F.) and held at such temperature for 30 (45 to 15) minutes, being meanwhile subjected to mechanical agitation. Time and temperature are inversely related, hence as higher temperatures are used, the treatment becomes shorter, and vice versa. The invention does not contemplate conjoint use of maximum temperature and maximum time within the specified ranges as this would result in excessive hydrolysis; and similarly minimum time and minimum temperatures give insufficient hydrolysis. The acidity is also a related variable, so that if more acid is used, the time and temperature would tend to be lower, whereas if less acid were used treatment would tend to be at higher temperatures and for longer time. Whatever the variations in these factors, however, the object should be at all times to produce hydrolysis equivalent to that resulting from employment of the specified preferred conditions, i. e., 175° F., 30 minutes, 0.6 normal HCl.

These conversion conditions are, within the limits indicated, critical and necessarily observed if successful operation in accordance with the invention is to be had. If the hydrolysis treatment is more severe than that specified, the resultant modified protein product will lack the adhesive properties which characterize the product of the invention; and if the gluten is insufficiently hydrolyzed the modified protein product will lack the dispersibility which characterizes the product of the invention. Such conditions are, or at least the degree of hydrolysis brought about thereby is, apparently required to produce a modified whole corn protein which can, by use of suitable dispersing agents, be readily dispersed at relatively low alkaline pH, e. g., 8.5, as distinguished from corn proteins which require high alkalinity for their dispersion, while insuring desired adhesive properties as well.

Hydrolysis as described performs two functions. First, it solubilizes any starch contained in the gluten by converting the same to sugars and dextrines, thus permitting facile removal, in water solution, of such carbohydrate material, so that the finished protein contains substantially no starch. Second, the whole protein is slightly modified with the consequence that desired properties of adhesiveness and dispersibility, in appropriate balance for useful application of the product, are imparted thereto. The preceding step of oil and color removal seems to exert, in a manner not wholly understood, an important and substantial influence upon the acid hydrolysis of the protein as herein described in bringing about production of a modified whole corn protein possessing the characteristics essential to its successful industrial application. Also the extraction appears to facilitate the filtration steps throughout the balance of the process.

The sodium bisulfite present in the slurry not only prevents the formation of dark color in the hydrolyzed protein, as would otherwise occur, but also appears to promote the dispersibility of the finished product.

Following hydrolysis as described, the slurry is then neutralized to 6.0 pH (5.5–6.0), as with 25° Bé. caustic soda solution, to arrest the hydrolyzing action. It is advantageous not to raise the pH above that specified, as this would tend to make for difficulty in the next step of the process, i. e., filtering, as in a Sperry plate and frame filter press or the like. The filter cake is then washed with water. Thus the solubilized starch conversion products and the salts formed upon neutralization are removed from the modified protein.

The moisture of the modified protein is then reduced to about 5–8%, preferably in two steps. First, air under pressure is blown through the filter before removal of the filter cake therefrom, thus to remove substantial quantities of water from the cake and at the same time facilitate subsequent removal of the cake from the filter. Second, cake removed from the filter is further dried to the desired final moisture content, as in a Raymond mill.

Preparation of the product is completed by suitably screening, as through a 60 mesh screen.

Aqueous dispersion of the modified whole corn protein product may be effected by alkali alone if sufficient alkali is used. Generally a pH in excess of 10.5 is required in such case. However, dispersion can be effected even more readily, and at lower pH, if any of a wide variety of wetting or dispersing agents, as follows, is used in conjunction with alkali:

*I. Alkali metal, ammonia, and amine soaps*

Examples of these are potassium stearate, ammonium stearate and sodium salts of any of the higher fatty acids having more than 12 carbon atoms such as oleic acid, capric acid, etc.

*II. The alkali metal, ammonia, amine or other water soluble soaps of rosin acids*

Examples are rosin size, ammonium resinate, etc.

*III. Sulfonated vegetable oils*

Examples of this group are sulfonated castor oil, sulfonated tall oil and sulfonated soya bean oil.

*IV. Sulfated and sulfonated fatty acids and their alkali metal, ammonia, amine, or other water soluble salts thereof*

Examples of these are the alkali metal, ammonia, amine and other water soluble salts of sulfonated oleic acid, sulfated ricinoleic acid, and similar compounds derived from the fatty acids obtained from vegetable oils such as castor, linseed, soya bean or cotton seed oil.

*V. Sulfated and sulfonated fatty alcohols and their alkali metal, ammonia, amine, or other water soluble salts*

Examples of these are sodium lauryl sulfate, the potassium, ammonia or amine salts of sulfonated or sulfated octyl, lauryl or stearyl alcohols.

*VI. Alkali metal, ammonia, amine or other water soluble salts of alkyl, aryl, alkyl-aryl, or heterocyclic sulfonic acid*

An example is the sodium salt of isopropyl naphthalene sulfonic acid.

*VII. The alkali metal salts of alkyl carboxylic acid*

An example is the sodium salt of monobutyl phthalate.

*VIII. Derivatives of any of the above groups which contain at least 8 carbon atoms in the organic radical and substituent group taken together*

An example is Igepon A. P. which is the sodium salt of oleyl-ethane sulfonic acid.

Such agents have heretofore been found highly advantageous to effect aqueous dispersion of zein, and their use as dispersants forms no part of the present invention.

The agents which have been found particularly effective for dispersing the modified whole corn protein herein described are dry rosin size, sulfonated oils such as sulfonated tall oil (Indusoil) and sulfonated castor oil, and the fatty alcohols such as Duponol M E. These wetting agents should, however, be used with sufficient alkali to establish a pH of about 8.5 or higher.

A typical formulation for the production of an aqueous dispersion is as follows:

| | Parts |
|---|---|
| Modified whole corn protein | 100 |
| Dry rosin size | 60 |
| Sodium hydroxide | 6 |
| Water | 500 |

These ingredients are heated with agitation at a temperature of about 160° F. for about 45 minutes to an hour. Similar formulations involving the wetting agents above referred to will readily suggest themselves to those skilled in the art.

The obvious advantages inherent in such water dispersion, as opposed to solution in strong alkali or organic solvents, will be recognized as among those characterizing the product of the present invention.

Such product, in some measure because of its ready dispersibility in water, and again because of its adhesive properties, finds application in a variety of industrial fields, of which the clay coating of paper is a significant example. As illustrative in this connection, reference will now be had to a typical clay coating formulation embodying the protein product of the present invention:

An aqueous dispersion of such protein product is formed by slurrying 100 parts thereof (all parts herein being specified by weight) in 630 (500 or more) parts of water, adding 60 parts (50-80) of sulfonated tall oil (50% concentration) with constant agitation, adding 175 parts (150-220) of normal caustic soda solution and heating the mixture, with agitation, at a temperature of about 175° F.-212° F. until dispersion is complete.

Then mix together 1000 parts (600-1200) of china clay, 600 parts (350-700) of water and 20 parts (12-24) of 1N caustic soda solution. Then add the aqueous protein dispersion and stir for about 30 minutes at room temperature. Upon passing through a 100 mesh screen, advisable to insure uniformity of fineness and smoothness in the finished composition, the clay coating composition will be ready for use. Such composition should, upon application to paper, result in a coating having a wax test rating of 4-5 or more.

We claim:

1. The process of preparing a modified whole corn protein from corn gluten which contains starch and at least about 50% of proteinaceous material, which comprises subjecting the gluten to oil and color extraction with a mixture of about 80% of a hydrocarbon solvent, about 10% of a low boiling aliphatic alcohol and about 10% of water, at a temperature not exceeding about 90° F. thereafter suspending the gluten in water to form a slurry, adding thereto sufficient mineral acid to establish acidity of the slurry at a pH corresponding to 0.6 normal in the case of hydrochloric acid, subjecting the acidified slurry to heat treatment at a temperature of 160°-200° F. for 45-15 minutes, adjusting the pH to about 5.5 to about 6.0, and recovering the modified protein from the treated slurry.

2. The process of preparing a modified whole corn protein from corn gluten which contains starch and at least about 50% of proteinaceous material, which comprises subjecting the gluten to extraction with a mixture of about 80% hexane, about 10% ethyl alcohol and about 10% water, at a temperature not exceeding about 90° F. to remove oil and color therefrom, thereafter forming an aqueous slurry of the gluten and water, the gluten in said slurry being present to the extent of about 30 to about 50 oz. dry substance per gallon of water, adding hydrochloric acid in amount to establish the acidity of the slurry at 0.6 normal, subjecting the acidified slurry to heat treatment at a temperature of 175° F. for 30 minutes, adjusting the pH to about 5.5 to about 6.0, and recovering the modified protein from the treated slurry.

RICHARD NICHOLAS MONTE.
JACOB B. GOTTFRIED.